(12) United States Patent
Kanaya

(10) Patent No.: US 7,388,864 B2
(45) Date of Patent: Jun. 17, 2008

(54) DATA COMMUNICATION APPARATUS, DATA COMMUNICATION SYSTEM, DATA COMMUNICATION METHOD, DATA COMMUNICATION PROGRAM AND INFORMATION RECORDING MEDIUM

(75) Inventor: Mitsuhisa Kanaya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 914 days.

(21) Appl. No.: 10/681,194

(22) Filed: Oct. 9, 2003

(65) Prior Publication Data
US 2004/0109467 A1  Jun. 10, 2004

(30) Foreign Application Priority Data

Oct. 11, 2002 (JP) ............................. 2002-299630
Oct. 7, 2003 (JP) ............................. 2003-347880

(51) Int. Cl.
*H04L 12/00* (2006.01)
(52) U.S. Cl. ...................... 370/390; 370/432
(58) Field of Classification Search ............... 370/432, 370/390, 352
See application file for complete search history.

(56) References Cited

U.S. PATENT DOCUMENTS

| 5,231,452 A | 7/1993 | Murayama et al. |
| 5,822,077 A | 10/1998 | Sasaki et al. |
| 6,226,011 B1 | 5/2001 | Sakuyama et al. |
| 6,334,161 B1 * | 12/2001 | Suzuki et al. ............... 710/29 |
| 7,224,702 B2 * | 5/2007 | Lee ............................. 370/473 |
| 2003/0012195 A1 * | 1/2003 | Ohkubo et al. ............. 370/390 |
| 2003/0227934 A1 * | 12/2003 | White et al. ................ 370/432 |
| 2004/0023665 A1 * | 2/2004 | Simmonds et al. ....... 455/456.1 |
| 2004/0071128 A1 * | 4/2004 | Jang et al. .................. 370/349 |

FOREIGN PATENT DOCUMENTS

| JP | 09-270790 | 10/1997 |
| JP | 10-111773 | 4/1998 |
| JP | 10-164174 | 6/1998 |
| JP | 10-307691 | 11/1998 |
| JP | 2000-49834 | 2/2000 |

* cited by examiner

*Primary Examiner*—Ricky Q. Ngo
*Assistant Examiner*—Dady Chery
(74) *Attorney, Agent, or Firm*—Dickstein Shapiro LLP

(57) ABSTRACT when receiving reception error information from at least one of a plurality of other transfer destinations which indicates that data reception has not been performed properly as a result of the data transfer being performed by a multicast communication manner for a plurality of other transfer destinations, data re-transfer to the at least one of other plurality of transfer destinations is performed with one selected from the multicast and unicast communication manners according to the number of the at least one of other plurality of transfer destinations which has transmitted the reception error information.

25 Claims, 11 Drawing Sheets

DATA COMMUNICATION APPARATUS, DATA COMMUNICATION SYSTEM, DATA COMMUNICATION METHOD, DATA COMMUNICATION PROGRAM AND INFORMATION RECORDING MEDIUM

BACKGROUND OF THE INVENTION

1. Field of the Invention

The present invention relates to a data communication apparatus which performs communications with other apparatuses with two methods including a method of transferring data from a single transfer source to another single transfer destination and a method of transferring data from a single transfer source to a plurality of other transfer destinations concurrently. Especially the present invention relates to a data communication apparatus which has a communication part which employs an IEEE (Institute of Electrical and Electronic Engineers) 1394 interface, a USB (Universal Serial Bus) interface, or so. Moreover, the present invention relates to a data communication system including the data communication apparatus and other apparatuses which act as data transfer destinations, a data communication method used in the data communication apparatus for performing the data communications, a data communication program which causes a computer which acts as a data communication apparatus to execute the data communication method, and a computer-readable information recording medium in which the data communication program is recorded.

2. The Description of the Related Art

In recent years, in order to transfer data which needs to be transferred in a real-time manner such as an animation or a sound, a telecommunication standard which has a mode (which guarantees transmission of data via a predetermined frequency band within a predetermined interval) called an isochronous transmission mode, has been enacted. This is for example, an IEEE Std 1394 standard or a USB standard, and communication interfaces based on the standards have been used widely.

Generally, such isochronous transmission achieves a high throughput compared with a so-called asynchronous transmission which performs reception check of data, and thus is suitable for a use of transferring within a predetermined time a lot of data. Therefore, it is possible to apply this mode also for transmission of image data for a printing apparatus, a scanner, or so other than transmission of so-called multimedia data, such as an animation, a sound, or so.

However, in the above-mentioned isochronous transmission mode, reception check of data is not performed instead of band width being guaranteed. Therefore, even if lack of data occurs due to a certain cause, re-transfer or so is not performed. Such a matter hardly becomes a problem in a use of transmission of an animation or a sound. However, for such a type of data as still image data used for a printing use, software program data or so for which even exiguity error cannot be allowed, it may cause a fatal problem. By this reason, a certain countermeasure is required.

Japanese laid-open patent application No. 10-111773 discloses a scheme for solving this problem. This enables bidirectional communications between a printer and a printer controller by carrying time sharing on a single isochronous channel. According to this configuration, data can be broadcast again even when an error occurs.

Japanese laid-open patent application No. 10-307691 discloses a scheme that printing data is transferred to a printing apparatus from a host by isochronous transmission, and, when an error occurs, it is notified to the host and the data is made to be re-transferred by asynchronous transmission.

Japanese laid-open patent application No. 10-164174 discloses a scheme that isochronous transmission is applied to perform data transmission, and, when an error occurs, asynchronous transmission is applied to make a resending request. Then, according to this, data is transferred by isochronous transmission.

According to such technologies, isochronous transmission can achieve high-speed data transmission. Furthermore, even when an error occurs, a recovery is performed, and, thus, reliable data transmission can be performed.

By the way, in the isochronous transmission, a so-called multicast method of transferring data to a plurality of transfer destinations concurrently from a single transfer source is applicable. That is, data transmission in a broadcast manner is attained. According to this method, printing data may be transferred simultaneously to a plurality of printers from a PC (personal computer), and, thus, simultaneously, each printer may be made to print the data, for example.

Japanese laid-open patent application No. 2000-49834 discloses a scheme of controlling data transmission in such a case, for example. This scheme chooses from a plurality of communication protocols a communication protocol used between a source node and a destination node. These plurality of protocols from which a relevant one is selected includes one of multicast method (for example, of isochronous transmission), and a unicast method (for example, of asynchronous transmission) of performing communications in a one-to-one manner.

SUMMARY OF THE INVENTION

In case where, as mentioned above, a multicast method is applied to perform data transmission, and when the data transmitted needs preciseness in transmission, such as print data, it is necessary to re-transfer data upon occurrence of a reception error. And it is necessary to perform re-transfer of the data only to a transfer destination at which the reception error took place. However, when the multicast method is applied to perform the re-transfer, data is re-transferred concurrently to all the transfer destinations. In such a case, it is necessary to perform negotiation beforehand with the transfer destinations at which no reception error has occurred, and to make them to ignore or invalid the reception (processing) of the data thus re-transferred. Such negotiation processing may require a traffic such as that which may not be ignored when the number of the transfer destinations of multicast manner amounts to a large value. Consequently, there may occur a problem that transmission efficiency may be degraded.

On the other hand, when the unicast method is applied to perform the re-transfer at a time of error occurrence, re-transfer should be made individually to each transfer destination one by one when there is a necessity of performing the re-transfer for many transfer destinations. As a result, communication operation should be made many times in total, and there may also occur a problem that transmission efficiency may be degraded.

Such a problem cannot be directly solved with the above-mentioned schemes disclosed by the Japanese laid-open patent applications Nos. 10-111773, 10-307691 and 10-164174. This is because there are no consideration especially given to data re-transfer in transmission according to the multicast method although there are consideration taken for isochronous transmission in these schemes.

Moreover, according to Japanese laid-open patent application No. 2000-49834, depending on a type of communication protocol which both the source node and destination node can handle, a communication protocol to be applied is determined. However, there is no consideration especially given to re-transfer of data at a time of reception error occurrence.

An object of the present invention is thus to solve the above-mentioned problem, and, to provide a configuration which is efficient in performing re-transfer of data at high speed even upon occurrence of data reception error, and thus to realize reliable data transmission while data is transferred in an efficient manner to a plurality of other transfer destinations concurrently from a single transfer source.

In order to attain the above-mentioned object, a data communication apparatus according to the present invention includes: a first communication part which transfers data from one single transfer source to a plurality of other transmission destinations concurrently; a second communication part which transfers data from one single transfer source to another single transfer destination; and a re-transfer part which, when receiving reception error information from at least one of a plurality of other transfer destinations which indicates that data reception has not been performed properly as a result of the data transfer being performed by the first communication part for the plurality of other transfer destinations, performs data re-transfer to the at least one of other plurality of transfer destinations with one selected from the first and second communication parts according to the number of the at least one of other plurality of transfer destinations which has transmitted the reception error information.

Further, a data communication system according to the present invention includes: at least one data communication apparatus, comprising a first communication part which transfers data from one single transfer source to a plurality of other transmission destinations concurrently, and a second communication part which transfers data from one single transfer source to another single transfer destination; and a plurality of receiving apparatuses comprising a part which receives data transferred from the at least one data communication apparatus, and a part which, upon data reception with the data receiving part has not been performed properly, transmits to the data transfer source reception error information indicating this matter, wherein: the at least one data communication apparatus comprises a re-transfer part which, when receiving reception error information from at least one of the plurality of receiving apparatuses which indicates that data reception has not been performed properly as a result of the data transfer being performed by the first communication part for the plurality of receiving apparatuses, performs data re-transfer to the at least one of receiving apparatuses with one selected from the first and second communication parts according to the number of the at least one of other plurality of receiving apparatuses which has transmitted the reception error information.

Furthermore, a data communication method according to the present invention for performing data communication among a plurality of apparatuses in use of a first communication manner of transferring data from one single transfer source to a plurality of other transmission destinations concurrently and a second communication manner of transferring data from one single transfer source to another single transfer destination, includes the step of: when receiving reception error information from at least one of a plurality of other transfer destinations which indicates that data reception has not been performed properly as a result of data transfer being performed in the first communication manner for the plurality of other transfer destinations, performing data re-transfer to the at least one of other plurality of transfer destinations with one selected from the first and second communication manners according to the number of the at least one of other plurality of transfer destinations which has transmitted the reception error information.

In the data communication apparatus, data communication system, or the data communication method according to the present invention, when data reception is not properly performed while transferring data to a plurality of other transfer destinations concurrently from a single transfer source, re-transfer of data can be performed and thus reliable data transmission can be realized, while the transmission can be performed at high speed, efficiently.

DETAILED DESCRIPTION OF THE PREFERRED EMBODIMENT

An embodiment of the present invention will now be described with reference to drawings.

First, hardware configurations of a data communication apparatus and a data communication system which includes the apparatus, according to an embodiment of the present invention will now be described with reference to FIGS. 1, 2 and 3.

Figure 1:
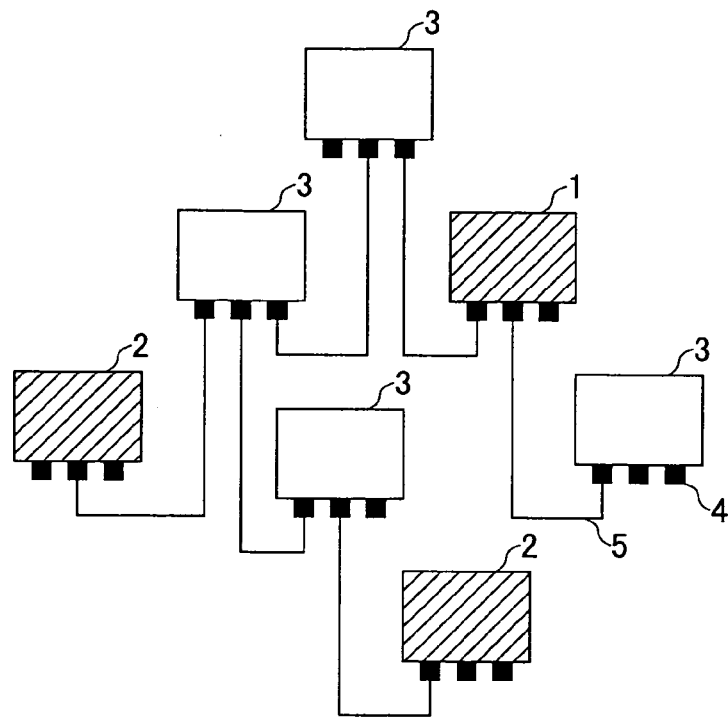
FIG. 1 shows an example of connection among respective apparatuses of a data communication system including data communication apparatuses according to an embodiment of the present invention.

FIG. 1 shows an example of connection of respective apparatuses included in the data communication system. FIG. 2 is a block diagram showing an example of configuration of a PC (personal computer, acting as a below-mentioned data source apparatus) included in the data communication system. FIG. 3 is a block diagram showing an example of configuration of a printer (acting as a below-mentioned data sink apparatus) also included in the data communication system.

As shown in FIG. 1, in the data communication system according to the embodiment of the present invention, each apparatus includes IEEE1394 ports 4, and therewith, data communications can be made among the plurality of apparatuses via communication cables 5, and, thus, via an IEEE1394 bus. And at least one of these apparatuses has a function of performing communications by applying properly one of a first predetermined communication manner and a second communication manner which will be described later.

The above-mentioned first communication manner is a communication manner which enables a relevant apparatus to perform communications with other apparatuses by a first predetermined communication way of transferring data to a plurality of other transfer destinations concurrently from a single transfer source. Moreover, the above-mentioned second communication manner is a communication manner which enables a relevant apparatus to perform communications with another apparatus by a predetermined second communication way of transferring data to another single transfer destination from a single transfer source.

In the data communication system shown, a personal computer (PC) 1 is assumed as a data communication apparatus which has a function of performing communications applying properly one of the above-mentioned first and second communication ways.

Figure 2:
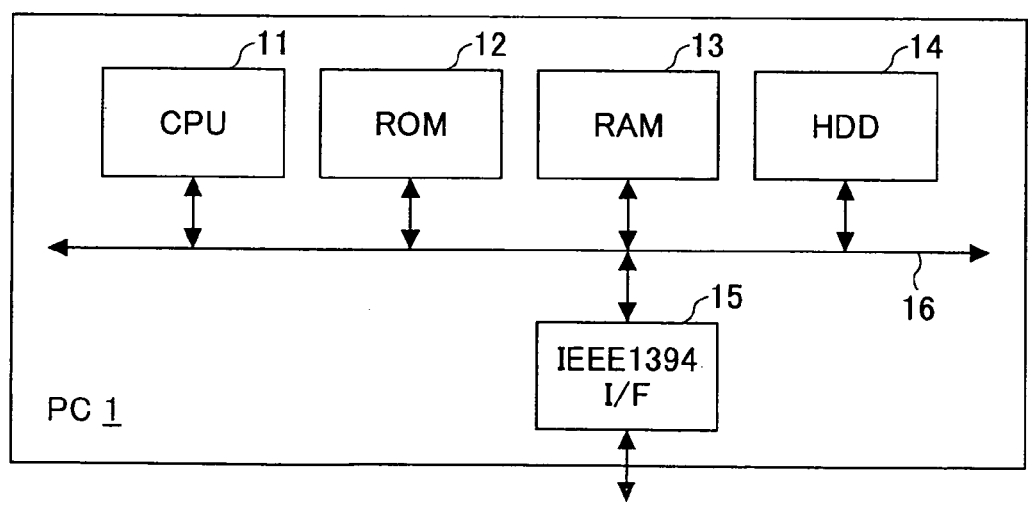
FIG. 2 is a block diagram showing an example of configuration of a PC acting a part of the data communication system shown in FIG. 1.
Figure 3:
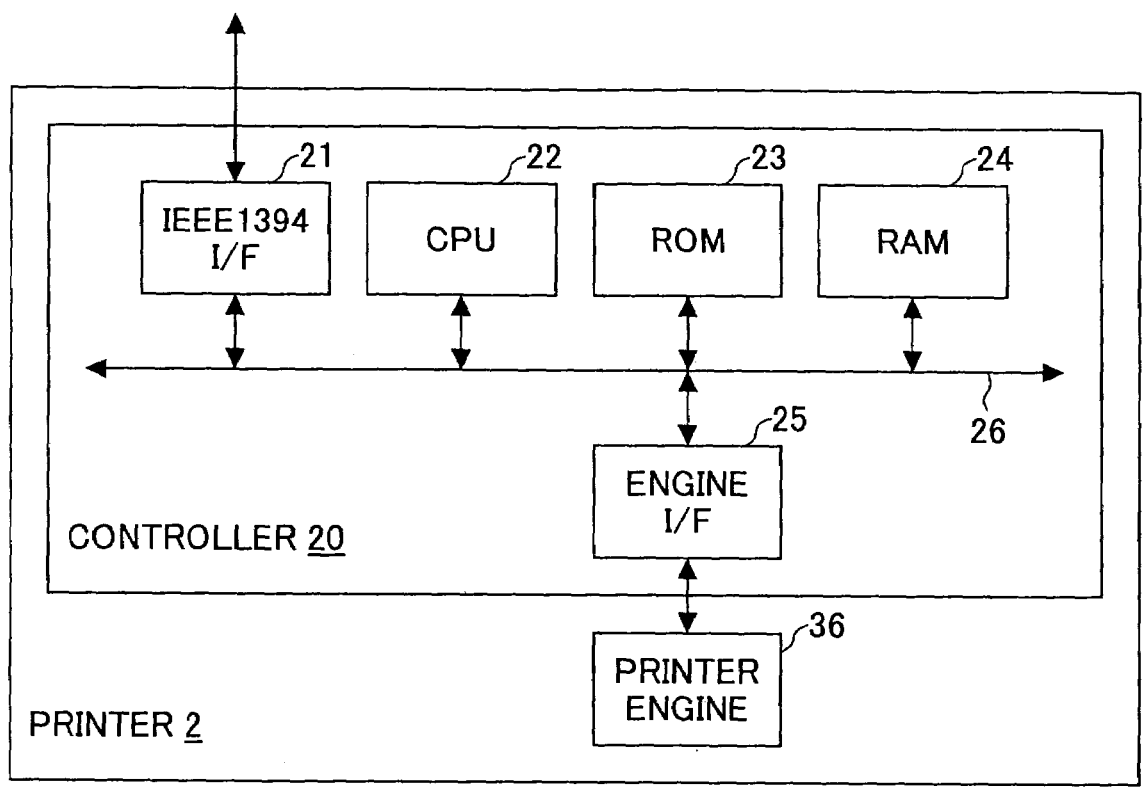
FIG. 3 is a block diagram showing an example of configuration of a printer also acting a part of the data communication system shown in FIG. 1.

The configuration of this PC 1 is as shown in FIG. 2, and includes a CPU 11, a ROM 12, a RAM13, a hard disk drive (HDD) 14, and an IEEE1394 interface (I/F) 15. Moreover, these parts/devices are connected by a system bus 16 together. Moreover, although not shown, an operation device and a display device as man-machine interface may also be provided therein.

A conventional machine may be applied as a hardware configuration of the PC 1, which executes various control programs and application programs stored in the ROM 12 or the HDD14 with the CPU 11, so as to control the respective devices/parts, and perform various functions.

Especially, in this PC 1, the IEEE1394 I/F 15 including the IEEE1394 ports 4 is provided, and the operation thereof is controlled by the CPU 11. As a result, the PC 1 performs data communication operation according to the standard of IEEE Std 1394. Then, consequently, the PC 1 performs communications applying properly one of the above-mentioned first and second communication ways. Moreover, in case the PC 1 performs communications with application of the above-mentioned first communication way (one to many) so as to perform data transmission, it also functions also as a re-transfer part if necessary as will be described.

The PC 1 acts as a first communication part by applying the above-mentioned first communication way (one to many) to perform data transfer, while the PC 1 acts as a second communication part by applying the above-mentioned second communication way (one to one) to perform data transfer.

In this data communication system, a well-known isochronous data transmission manner is applied as the above-mentioned first communication way of transferring data from a single one transfer source to a plurality of another transfer designations concurrently, i.e., a multicast data transmission way, while an asynchronous data transfer manner is applied as the above-mentioned way of transferring data from a single one transfer source to a single another transfer destination, i.e., a unicast data transmission way. It is noted that the above-mentioned asynchronous data transfer manner in the IEEE standard is equivalent to a bulk transfer manner, an interrupt transfer manner or so according to the USB standard.

Moreover, in the data communication system, there are provided a plurality of receiving units as apparatuses which act as transfer destinations for data transmitted from the PC 1 acting as a data source apparatus, i.e., data sink apparatuses, are provided. These receiving units are assumed to have configurations, each of which can transfer to the transfer source predetermined reception error information which shows that data reception has not been made properly when the reception of the data transferred from the data sink apparatus has not been performed properly.

Specifically, a plurality of printers 2 and a plurality of other peripheral apparatuses 3 are provided as these receiving units. Each of these printers 2 has a configuration as shown in FIG. 3, and includes a controller 20 and a printer engine 36. And an operation of the printer engine 36 is controlled by the controller 20 which acts as a control unit.

Moreover, an IEEE1394 I/F 21, a CPU 22, a ROM 23 and a RAM 24, and an engine I/F 25 are contained in the controller 20 as shown. And these are mutually connected by a system bus 26. And operation of each part thereof is controlled by the CPU 22 which executed various control programs stored in the ROM 23. Data transmission/reception operation according to the standard of IEEE Std 1394 in the printer 2 is attained as the CPU 22 controls operation of the above-mentioned IEEE1394 I/F 21 including the IEEE1394 ports 4.

In the above-mentioned isochronous data transmission manner, a plurality of nodes which recognize a channel number can receive the relevant data simultaneously. Thereby, as shown in FIG. 1, it is possible to connect a plurality of data sink apparatuses (the printers 2 and peripheral apparatuses 3) used as data transfer destinations to the data source apparatus (the PC 1) which acts as the data transfer source, and the multicast transmission scheme can be achieved there.

In addition, these apparatuses do not need to be connected directly and may be connected in a tree manner or so. Moreover, in this example, the two sets of printers 2, the one set of PC 1 and the four sets of peripheral apparatuses 3 are connected mutually as shown in FIG. 1. However, this configuration is merely an example and the numbers or the types of the respective apparatuses to be connected to form the data communication system should not be limited thereto.

Furthermore, in the isochronous transmission, not only operation of transferring to all the apparatuses connected, but also operation of selecting a plurality of transfer destinations and transferring of data only to them may also be applied. That is, an apparatus which is neither a data source nor a data sink may exist on the same bus. Assuming such a configuration, it is possible to transfer printing data from the PC 1 only to the two sets of printers 2 simultaneously, and to make them perform image formation perform therewith simultaneously. Moreover, it is also possible to assume a configuration in which a plurality of sets, each including a data source apparatus(es) and data sink apparatuses, exist on the same bus.

Next, a configuration of data communication path in the data transmission system mentioned above with reference FIG. 1 will now be described with reference to FIG. 4 and FIG. 5.

Figure 4:
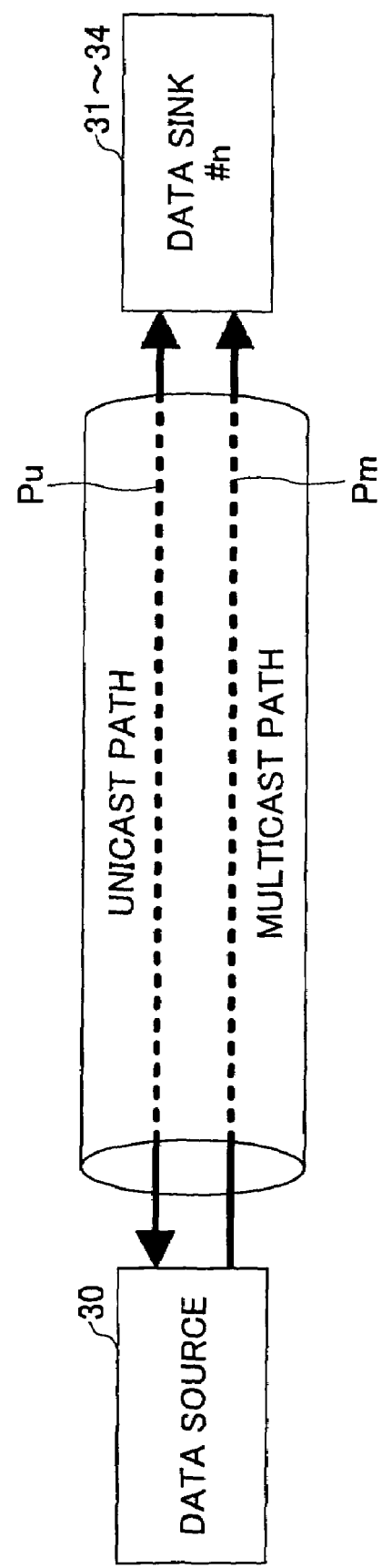
FIGS. 4 and 5 illustrate communication paths used to connect between the apparatuses in the data communication system shown in FIG. 1.

As shown in FIG. 4, in a physical communication circuit between the above-mentioned data source apparatus (i.e., a data source apparatus 30), and each data sink apparatus (i.e., a data sink apparatus 31 through 34), two types of logical communication paths called a unicast communication path Pu which can perform bidirectional communications, and a multicast communication path Pm which enables communications in a single direction from the data source apparatus 30 to the data sink apparatuses 31 through 34. In addition, these two types of communication paths Pu and Pm are provided logically, and, thus, they may be provided with a common single physical circuit.

In other words, in such a case, either in a case of applying the multicast communication path, or a case of applying the unicast communication path, a relevant signal is physically transmitted to all the nodes. However, these two types of communication paths may be distinguished from whether or not a specific transfer destination is specified. In this way, the unicast communication path is achieved by specifying a particular transfer destination, while the multicast communication path is achieved by not specifying any particular transfer destination.

Figure 5:
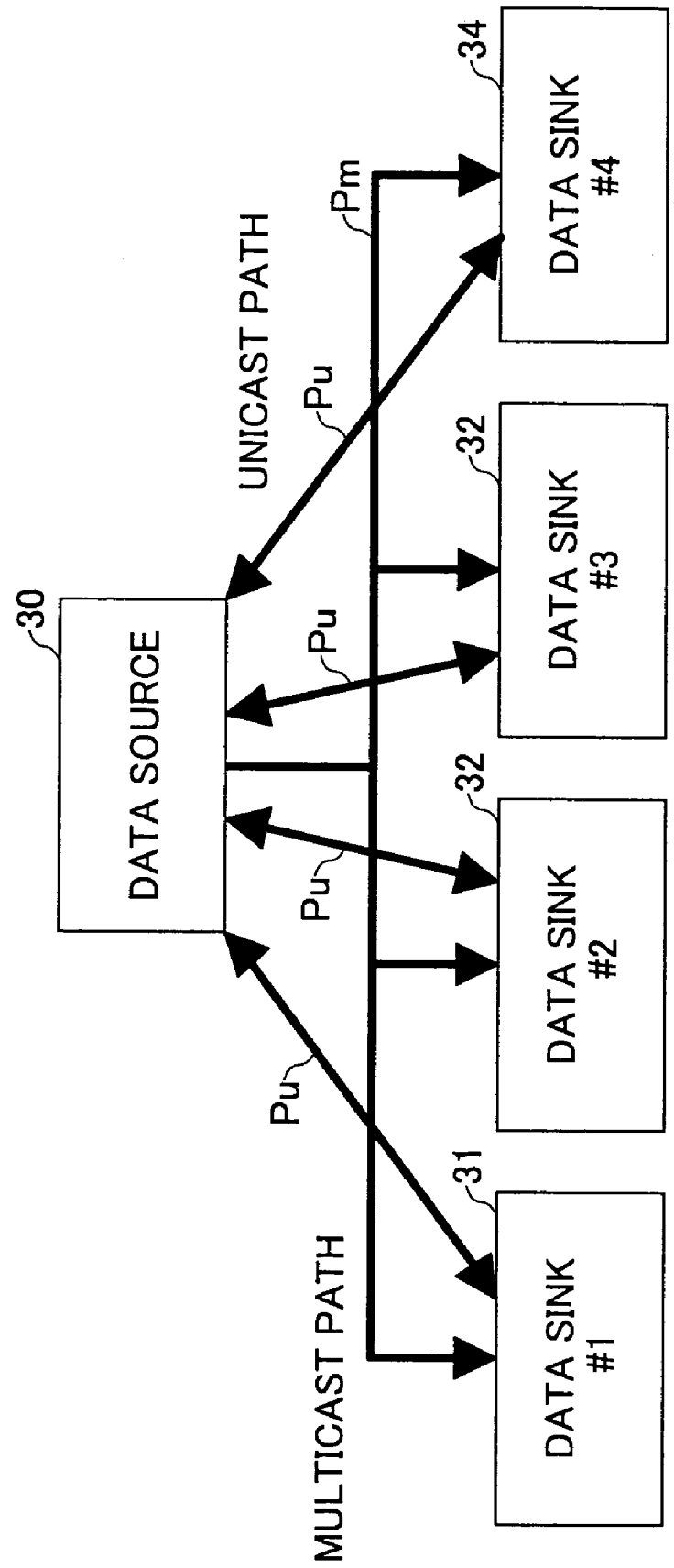

Accordingly, as shown in FIG. 5, between the data source apparatus 30 and the plurality of data sink apparatuses 31 through 34, there are provided the two types of logical communication paths, i.e., the logical unicast communication path Pu provided individually between each of the data sink apparatuses 31 through 34 and the data source apparatus 30, and the logical single multicast communication path Pm shared between all the data sink apparatuses 31 through 34.

In addition, it is possible to apply a method for achieving the above-mentioned two types of logical communication paths, by, for example, applying "multiple address assignment" for achieving the multicast communication path Pm while applying "single address assignment" for achieving the unicast communication path Pu. Next, operation control of data transmission way according to the embodiment of the present invention at a time of data transmission in such data transmission apparatuses or data transmission system will be described in an illustration manner with reference to FIG. 6 through FIG. 10.

Figure 6:
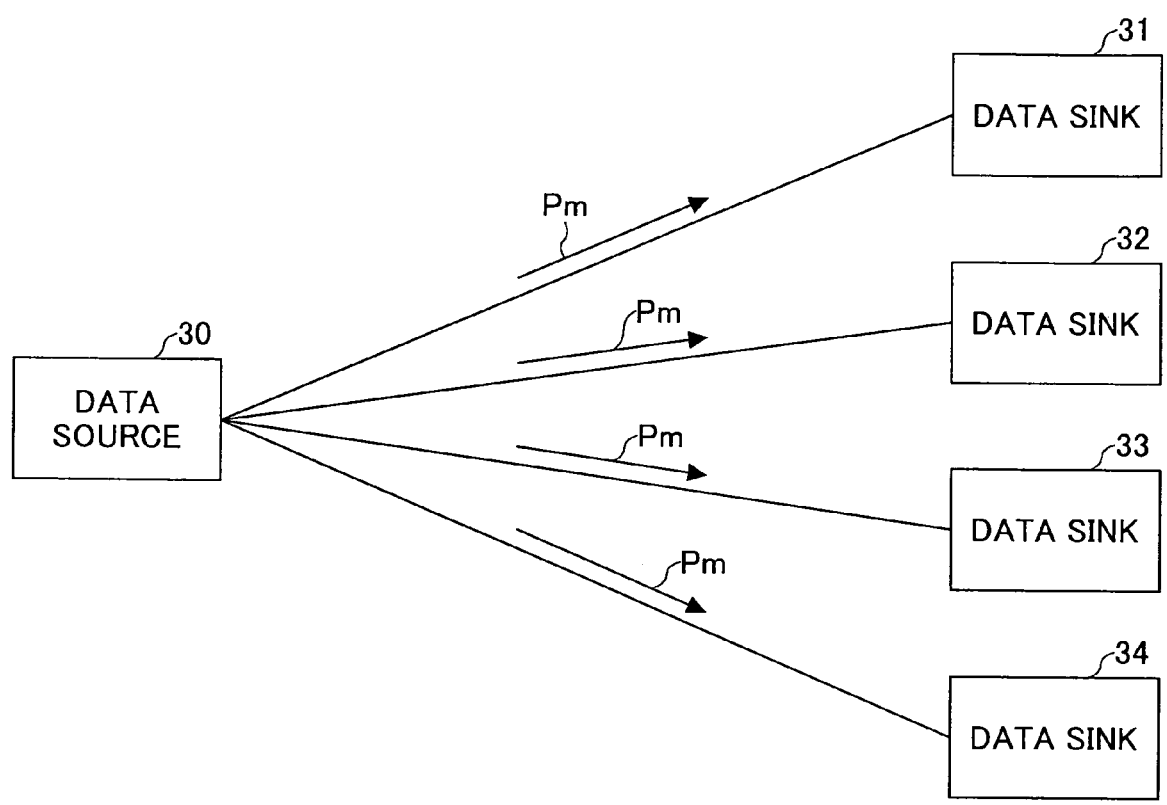
FIG. 6 illustrates processing performed when a reception error has not taken place at a time of data transmission with a multicast data transmission manner in the data communication system according to the embodiment of the present invention.
Figure 7:
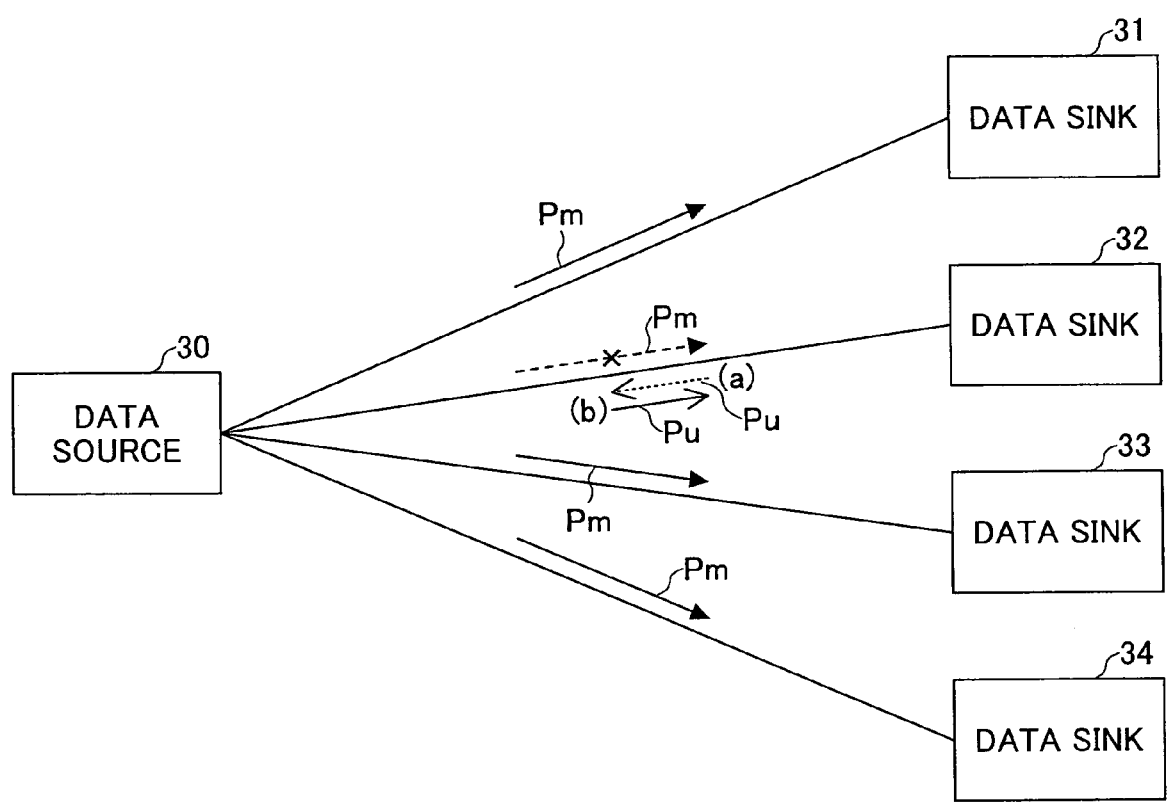
FIG. 7 illustrates processing performed when a reception error has taken place at one transfer destination at a time of data transmission with the multicast data transmission manner in the data communication system according to the embodiment of the present invention.
Figure 8:
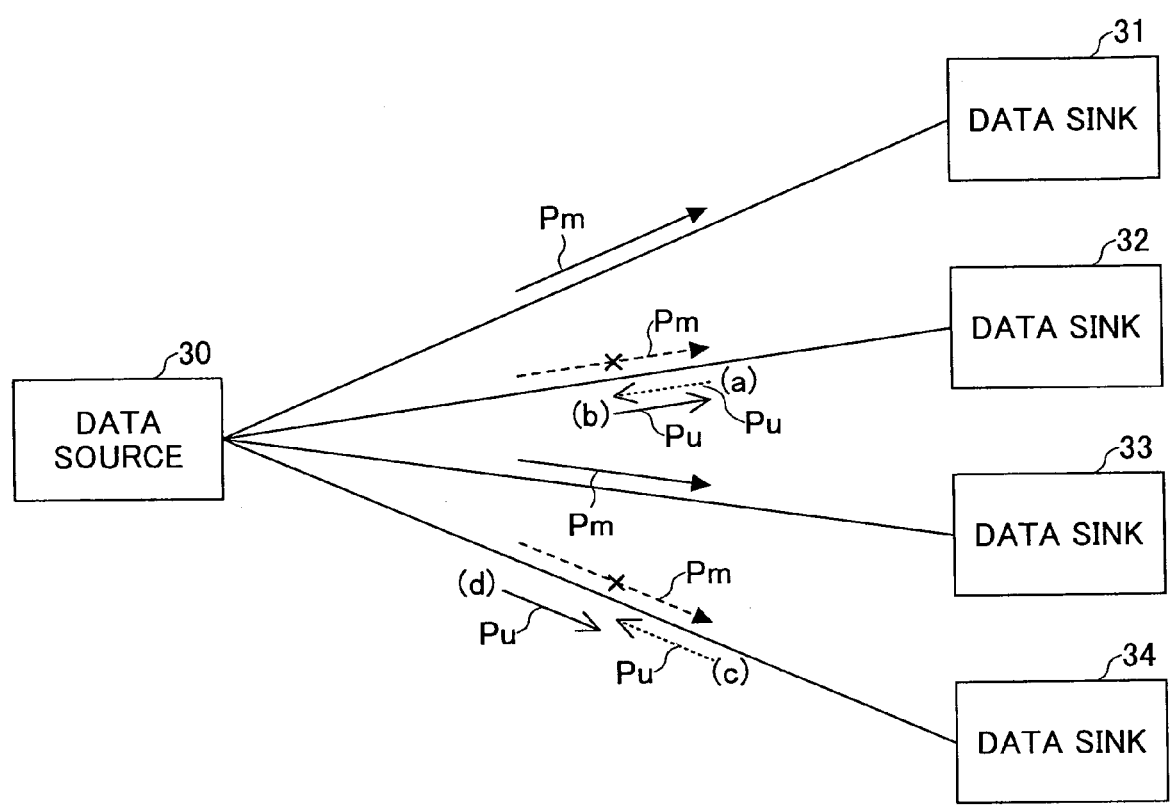
FIG. 8 illustrates processing performed when reception errors have taken place at two transfer destinations at a time of data transmission with the multicast data transmission manner in the data communication system according to the embodiment of the present invention.
Figure 9:
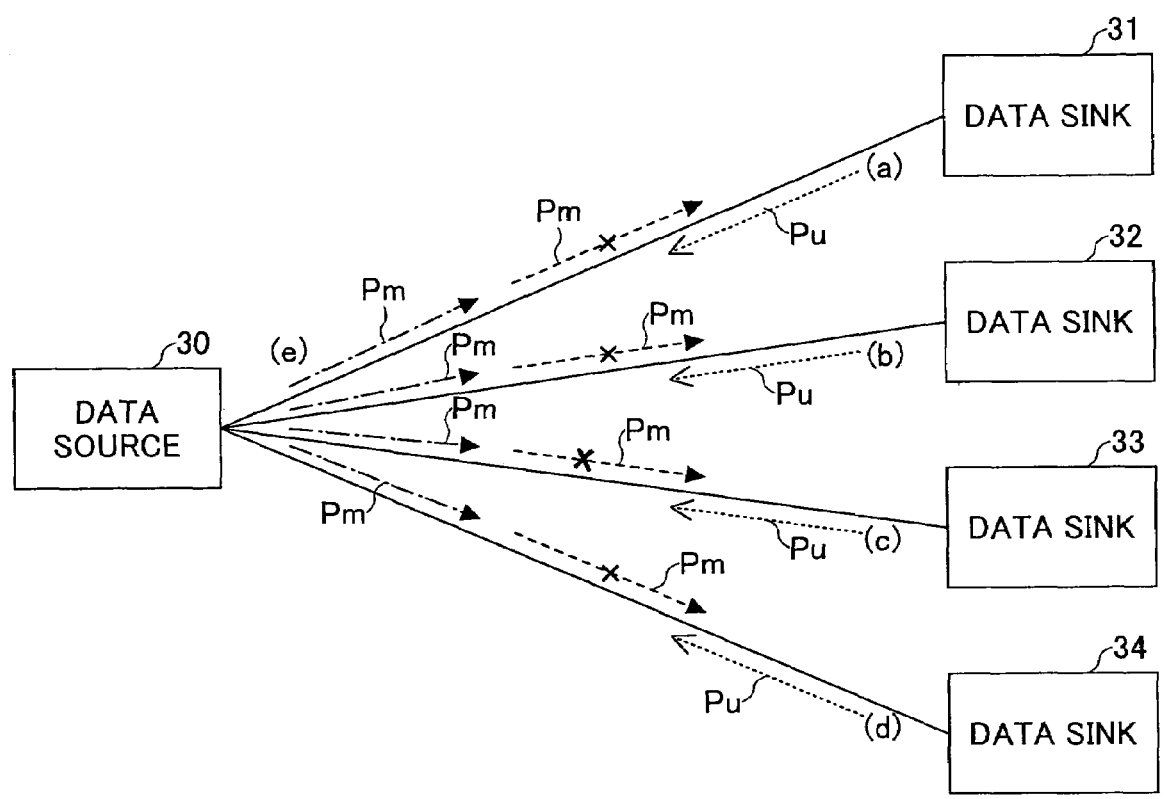
FIG. 9 illustrates processing performed when reception errors have taken place at all the transfer destinations at a time of data transmission with the multicast data transmission manner in the data communication system according to the embodiment of the present invention.
Figure 10:
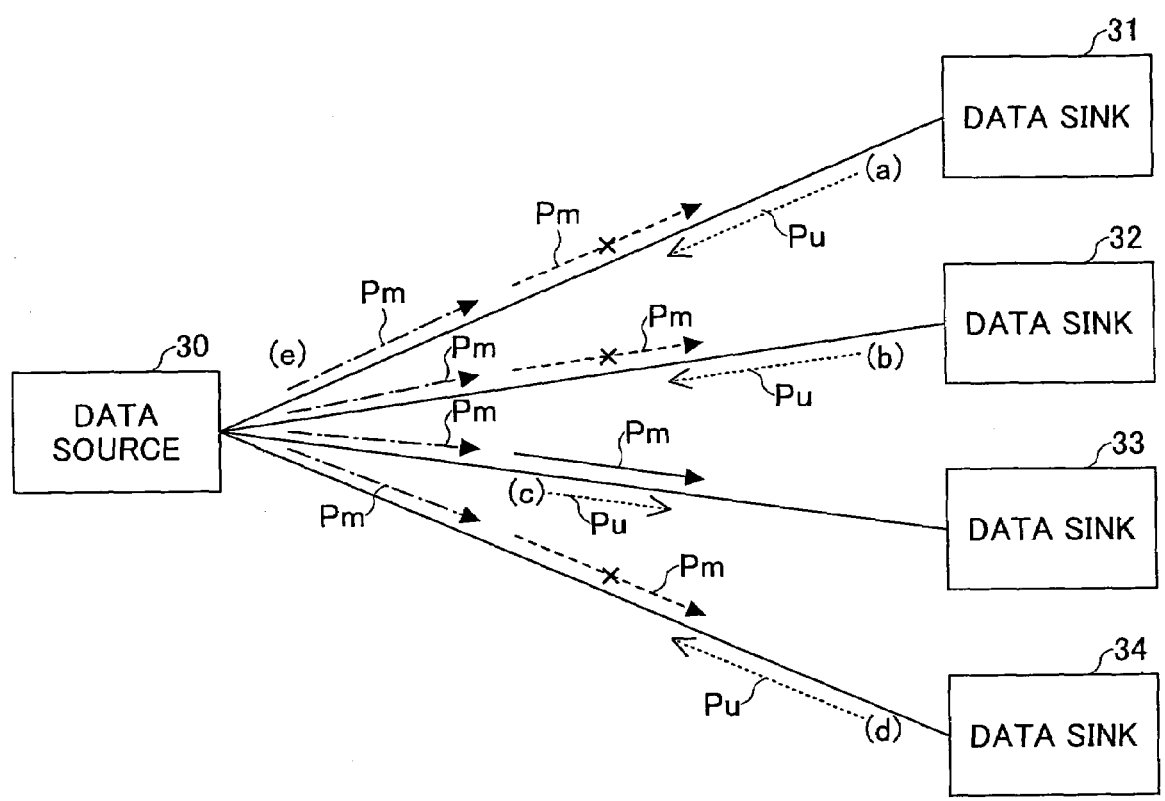
FIG. 10 illustrates processing performed when reception errors have taken place at all the transfer destinations but one at a time of data transmission with the multicast data transmission manner in the data communication system according to the embodiment of the present invention.

FIG. 6 illustrates processing performed when no reception error has taken placed at any data transfer destination according to the multicast way. FIG. 7 illustrates processing performed when a reception error has occurred only at one transfer destination. FIG. 8 illustrates processing performed when reception errors have occurred at two transfer destinations. FIG. 9 illustrates processing performed when reception errors have occurred at all the transfer destinations. FIG. 10 illustrates processing performed when reception errors have occurred at all the transfer destinations but one.

In addition, in these figures, different from the above-mentioned FIG. 1, data transmission is performed from one data source apparatus 30 to the four data sink apparatuses 31 through 34, as an example.

When performing data transmission according to the multicast manner, the data source apparatus 30 (i.e., the PC 1 in FIG. 1) prepares data to send to the data sink apparatuses 31 through 34 (i.e., the printers 2 in FIG. 1), and the data is transferred to the data sink apparatuses 31 through 34 via the logical data communication paths (multicast communication path Pm shown in FIGS. 4 and 5) previously provided.

In case each data sink apparatus is a printing apparatus as a printer, the data transferred may be printing data, such as image data. Moreover, as the communication path applied for data transmission in this case, when using an IEEE1394 bus, an isochronous stream channel according to the standard of IEEE Std 1394 assigned a band and a channel number thanks to a predetermined protocol, or an asynchronous stream channel according to the standard of IEEE Std 1394a assigned only a channel number thanks to a predetermined protocol may be applied.

In the data sink apparatuses 31 through 34, while receiving the data thus transferred from the data source apparatus 30, it is determined for each transfer data unit, whether the received information is valid, whether there occur information lack, or so, i.e., it is determined whether the information has been properly received. There are various well-known methods which can be applied in this case. That is, a simple method in which reception of information is verified for each information unit, a method in which IDs such as consecutive numbers are assigned for respective information units (packets) and therewith, data lack is detected, a method in which a checksum or a CRC (cyclic redundancy check) mark is added for each information unit, and a reception error is detected therewith, or so, may be applied.

When neither lack nor error is detected in the data reception (i.e., when no error has occurred in the data transmission), the data transmission is continued, the following data is also made transferred successively, and as shown in FIG. 6, the data is transferred to the data sink apparatuses 31 through 34 successively concurrently from the data source apparatus 30.

On the other hand, when lack or error of data is detected, the detecting data sink apparatus transfers reception error information which shows this matter to the data source apparatus 30 which is the transfer source of the data. This transmission can be performed by sending a re-transmission request to the data source apparatus 30 using a one-to-one communication path (namely, the unicast communication path Pu shown in FIGS. 4 and 5), i.e., for example, in the asynchronous transmission manner.

The data source apparatus 30 then determines, in response to the reception error information sent from at least one of the data sink apparatuses 31 through 34, according to the number of the data sink apparatuses of the transfer destinations which thus have sent the reception error information, either the isochronous transmission (namely, the multicast communication path Pm), or the asynchronous transmission (namely, the unicast communication path Pu) is applied. And, in the thus-selected data transmission manner, the data for which the reception has not been performed properly is re-transferred to the relevant data sink apparatuses which have sent the reception error information.

It is more efficient to perform the re-transfer of data individually using the one-to-one communication path Pu between the data source apparatus 30 and each of the data sink apparatuses at which the error has occurred, when the reception errors have taken place only at a small number of data sink apparatuses. That is, if the isochronous transmission Pm of the multicast manner is applied to perform the re-transfer in this case to the contrary, the data is re-transferred also to the transfer destinations at each of which no error has occurred. Therefore, when applying the multicast manner for the re-transfer in this case, it is necessary beforehand to perform a negotiation between the data source apparatus 30 and the relevant data sink apparatus at which no reception error has occurred such that this data sink apparatus should ignore the thus-re-transferred data. Therefore, in case the number of data sink apparatuses with which such negotiation should be made is large, the traffic required therefor may have an amount which cannot be ignored compared with the size of the actual data to be re-transferred.

On the contrary, in case the reception errors have occurred at all of or almost all of the data sink apparatuses for the same data, the re-transfer of the data needed should be performed by the isochronous multicast transmission path Pm even considering the overhead needed for the above-mentioned negotiation (for ignorance) concerning the error transfer control compared with a case where, even in such a case, the asynchronous unicast transmission path Pu is applied. This is because, in such a case where the number of the data sink apparatuses to which actually the data should be re-transferred is large, the re-transfer to all of these targets can be achieved only by one time of communication operation, and, thus, the data transmission efficiency can be improved.

According to the data communication system according to the embodiment of the present invention, it is determined whether the isochronous transmission path Pm or the asynchronous transmission path Pu is applied for the re-transfer of data, according to the number of the transfer destination data sink apparatuses which have sent the relevant reception error information.

Operation in a case of carrying out of data transmission applying the asynchronous transmission path Pu for such a re-transfer occasion will now be first described.

For example, as shown in FIG. 7, when a reception error has occurred only at the data sink apparatus 32, the data sink apparatus 32 sends a re-transmission request for a data transmission unit for which the error has been detected, as the reception error information to the data source apparatus 30 as shown in an arrow (a). And the data source apparatus 30 which has thus received the re-transmission request transfers the data concerning the re-transmission request only to the data sink apparatus 32 which has made the re-transmission request by the asynchronous transmission path Pu, as shown in an arrow (b). Since the asynchronous transmission path Pu is for one-to-one communications, the re-transferred data is not received by the other data sink apparatuses. Therefore, the communication cost required for the re-transfer due to the transmission error in this case is of two times of communication operations, shown by the arrows (a) and (b).

Moreover, as shown in FIG. 8, when reception errors have occurred at the two data sink apparatuses 32 and 34, these apparatuses perform the re-transmission request as shown by arrows (a) and (c) to the data source apparatus 30, respectively, and the data source apparatus 30 transfers again the data relevant to the re-transmission request, respectively, as shown by arrows (b) and (d) according to these requests, via the asynchronous transmission paths Pu. And the communication cost required for the re-transfer due to the error in this case is a total of the four times of communication operations, shown by the arrows (a), (b), (c), and (d).

Thus, in case of performing re-transfer of data applying the asynchronous transmission path Pu, the cost of communications required is calculated by the following formula:

(the number of data sink apparatuses at which the reception errors occur)×2

The number of times of communication operations obtained from this formula is required as the cost of communications.

Next, operation in a case of performing re-transfer applying the isochronous transmission path Pm will be described.

For example, as shown in FIG. 9, when reception errors have occurred at all the data sink apparatuses 31 through 34, these data sink apparatuses 31 through 34 transfer re-transmission requests for a transmission unit for which the error is detected, as the reception error information to the data source apparatus 30 as shown by arrows (a) through (d), respectively. And the data source apparatus 30 which has thus received the re-transmission requests transfers again the data concerning the re-transmission requests to all the data sink apparatuses 31 through 34 via the isochronous transmission path Pm, as shown by an arrow (e). Since the transmission via the isochronous transmission path Pm is transmission of a simultaneous multicast manner as mentioned above, the re-transfer of data to all the data sink apparatuses 31 through 34 can be achieved only by one time of communication operation. Therefore, the communication cost required for the re-transfer due to the error in this case is a total of the five times of communication operations shown by the arrows (a) through (e).

Moreover, as shown in FIG. 10, when reception errors have occurred at all the data sink apparatuses but the data sink apparatus 33, the data sink apparatuses 31, 32 and 34 at which the reception errors have occurred transfer re-transmission requests to the data source apparatus 30, as shown by arrows (a), (b), and (d), respectively. And the data source apparatus 30 which has thus received the re-transmission requests transfers again the data relevant to the re-transmission requests as in the case of FIG. 9 as shown by arrows (e) via one time of communication operation applying the isochronous transmission path Pm. However, in the communications applying the isochronous transmission path, as mentioned above, the thus-re-transferred data is received by all the data sink apparatuses 31 through 34 including the data sink apparatus 33 at which no reception error has occurred. Therefore, an instruction for causing the data sink apparatus 33 at which no reception error has occurred to ignore the thus-re-transferred data, in prior to the relevant re-transfer transmission.

By doing in this way, the isochronous transmission path Pm can be applied to achieve re-transfer of data only to the necessary data sink apparatuses 31, 32, and 34 substantially. And the communication cost required for the re-transfer due to the error in this case also is a total of the five times of communications of the arrows (a) through (e).

Thus, when applying the isochronous transmission path Pm to the data re-transfer, the re-transmission request is needed for the data sink apparatus at which the reception error has occurred, while the instruction for ignorance of the re-transferred data is needed for the data sink apparatus at which no reception error has occurred. In total thereof, the number of times of communication operations needed for these communications (re-transmission request and negotiation) corresponds to the number of all the data sink apparatuses concerned. Furthermore, in addition thereto, one communication operation of the isochronous transmission path Pm for the actual data re-transfer is needed. Therefore, the total cost needed for the re-transfer of data does not depend on the number of the data sink apparatuses at which the reception errors have occurred, and is obtained from the following formula:

(the number of all the data sink apparatuses)+1

The number of times of communication operations obtained from this formula is required as the cost of communications.

In summary, the total number of times of necessary communication operations can be minimized, in other words, the communication efficiency is improved by applying the unicast asynchronous transmission path Pu than applying the multicast isochronous transmission path Pm for the data re-transfer in case the requirement expressed by the following formula (1) is satisfied. On the other hand, vise versa, the communication efficiency is improved rather by applying the multicast isochronous transmission path Pm than applying the unicast asynchronous transmission path Pu for the data re-transfer in case the requirement expressed by the following formula (2) is satisfied. Upon satisfaction of the requirement expressed by the remaining formula (3), the total number of times of necessary communication operations becomes equal between the application of both the types of communication manners, the communication efficiency becomes equal and, thus, either one may be applied in terms of the communication cost.

(the number of data sink apparatuses having reception errors)×2<(the number of all the data sink apparatuses)+1     (1)

(the number of data sink apparatuses having reception errors)×2>(the number of all the data sink apparatuses)+1     (2)

(the number of data sink apparatuses having reception errors)×2=(the number of all the data sink apparatuses)+1     (3)

For example, in the case of FIG. 7, since the number of reception error occurring data sink apparatuses is 1, the left-hand term in each of the above formulas becomes 2, and since the number of all the data sink apparatuses is 4, the right-hand term becomes 5. As a result, the right-hand term becomes larger than the left-hand term, and, thus, the formula (1) holds. Accordingly, the unicast asynchronous path Pu is applied for the re-transfer.

Similarly, in the case of FIG. 8, since the number of reception error occurring data sink apparatuses is 2, the left-hand term in each formula becomes set to 4, while the right-hand term becomes 5 at any time. As a result, the right-hand term becomes larger, the formula (1) also holds in this case, and thus, the unicast asynchronous path Pu is selected for the re-transfer.

In the case of FIG. 9, since the number of reception error occurring data sink apparatuses is 4, the left-hand term in each formula becomes 8, and the right-hand term becomes 5. As a result, the left-hand term becomes larger, the formula (2) holds in this case, and thus, the multicast isochronous path Pm is selected for the re-transfer.

Similarly, in the case of FIG. 10, since the number of reception error occurring data sink apparatuses is 3, the left-hand term in each formula becomes 6, and the right-hand term becomes 5. As a result, the left-hand term becomes larger, the formula (2) holds also in this case, and the multicast isochronous path Pm is selected for the re-transfer.

Thus, as the number of all the data sink apparatuses is fixed, i.e., the right-hand term does not change during a relevant series of data transmission, in these formulas, only the number of the data sink apparatuses at which reception errors occur, i.e., the left-hand term, changes. And this number changing is equal to the number the transfer destinations which have sent the reception error information. Thus, in the data communication apparatus in the data communication system according to the embodiment of the present invention, when performing re-transfer of data for which re-transfer request arises or reception error has occurred, according to the above-mentioned formulas (1) through (3), depending on the number of transfer destinations which have transmitted the reception error information, either the isochronous transmission path Pm or the asynchronous transmission path Pu, which should result in the higher communications efficiency, is selected. Then, with the thus-selected communication path, the re-transfer is performed. Thereby, it become possible to achieve the higher communication efficiency at a time of data re-transfer.

A base of applying the above-described calculation method (applying the above-mentioned formulas (1) through (3)) will now be described. This assumes that, not a data size of each packet, but the number of packets more strongly influences the throughput (traffic) obtained. Therefore, by reducing the required number of times of communication operations, improvement of the communication efficiency is achieved.

Figure 11:
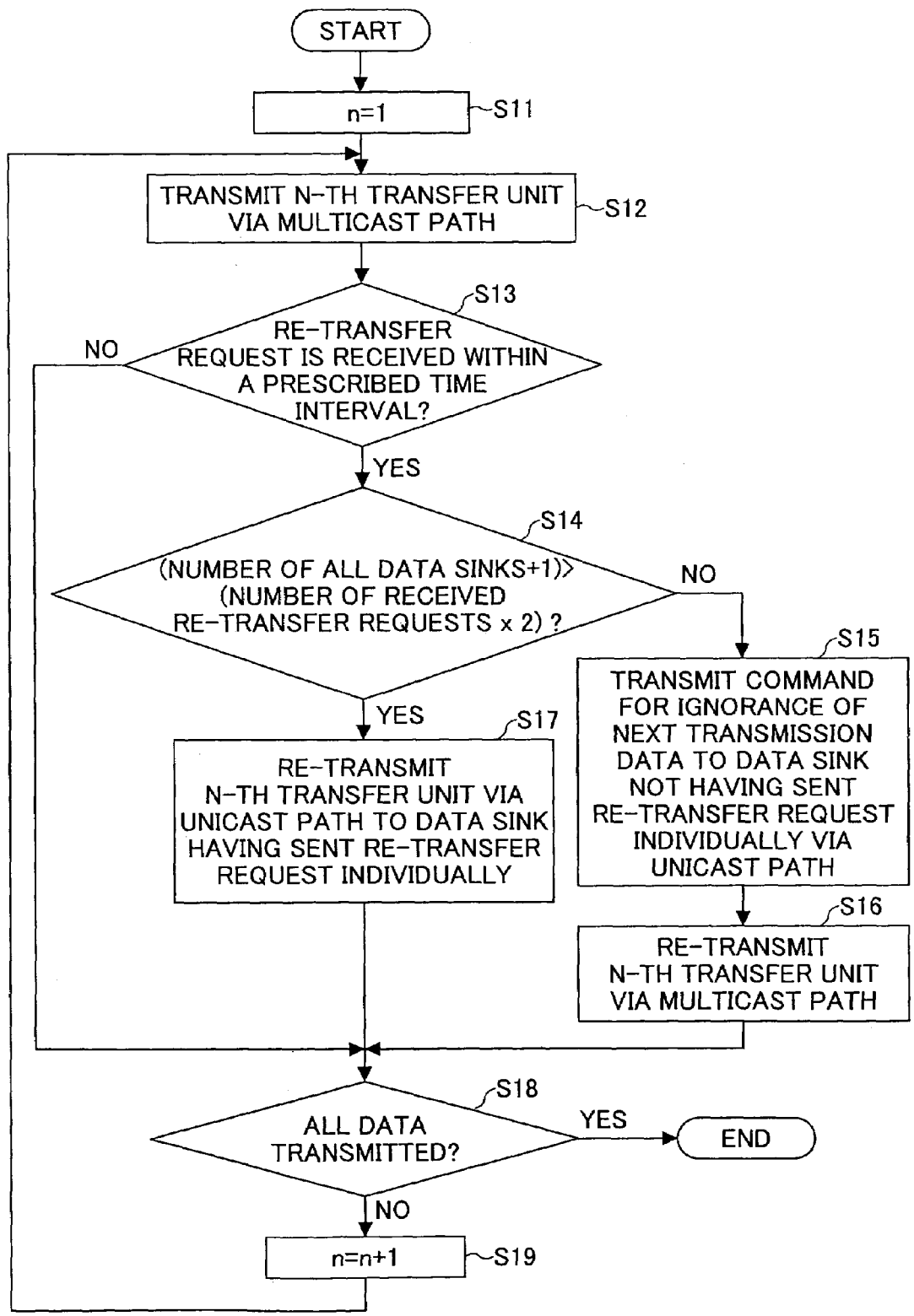
FIG. 11 is an operation flow chart which shows operation of the data source apparatus in the embodiment of the present invention.

With reference to FIG. 11, a flow of operation of the above-mentioned data source apparatus 30 in a case of transmission of data in a state in which the transmission data is divided into n transfer units will now be described.

A parameter n which indicates the number of the transmission data unit is initialized into 1 at Step S11. Next, the n-th transfer unit is transferred to the data sink apparatus with the multicast transmission path Pm at Step S12. It is determined at Step S13 whether a re-transmission request is received from a data sink apparatus within a predetermined time interval. And when the determination result is Yes, it is determined whether or not the above-mentioned formula (1) holds at Step S14. When the determination result is Yes, the unicast communication path Pu is applied in accordance with the above-mentioned rule using the above-mentioned formulas (1) through (3), and the n-th transfer unit concerned is individually re-transferred to the data sink apparatus of re-transmission request source.

On the other hand, when the determination result of Step S14 is No (i.e., the formula (1) does not hold), it means that the above-mentioned formula (2) or formula (3) holds. Therefore, after transferring individually a command for ignorance of the following transferred data to the data sink apparatuses which have not sent the re-transmission requests via the unicast communication path Pu at Step S1S, the n-th transfer unit concerned is re-transferred to all the data sink apparatuses at Step S16 via the multicast communication path Pm.

And it is determined whether or not the series of data transmission is completed for all the n transfer units, at Step S18. When the determination result is Yes, the transferring processing concerned is ended. However, in case of No, the parameter n is incremented by 1 at Step S19, and the processing from Step S12 is repeated.

Figure 12:
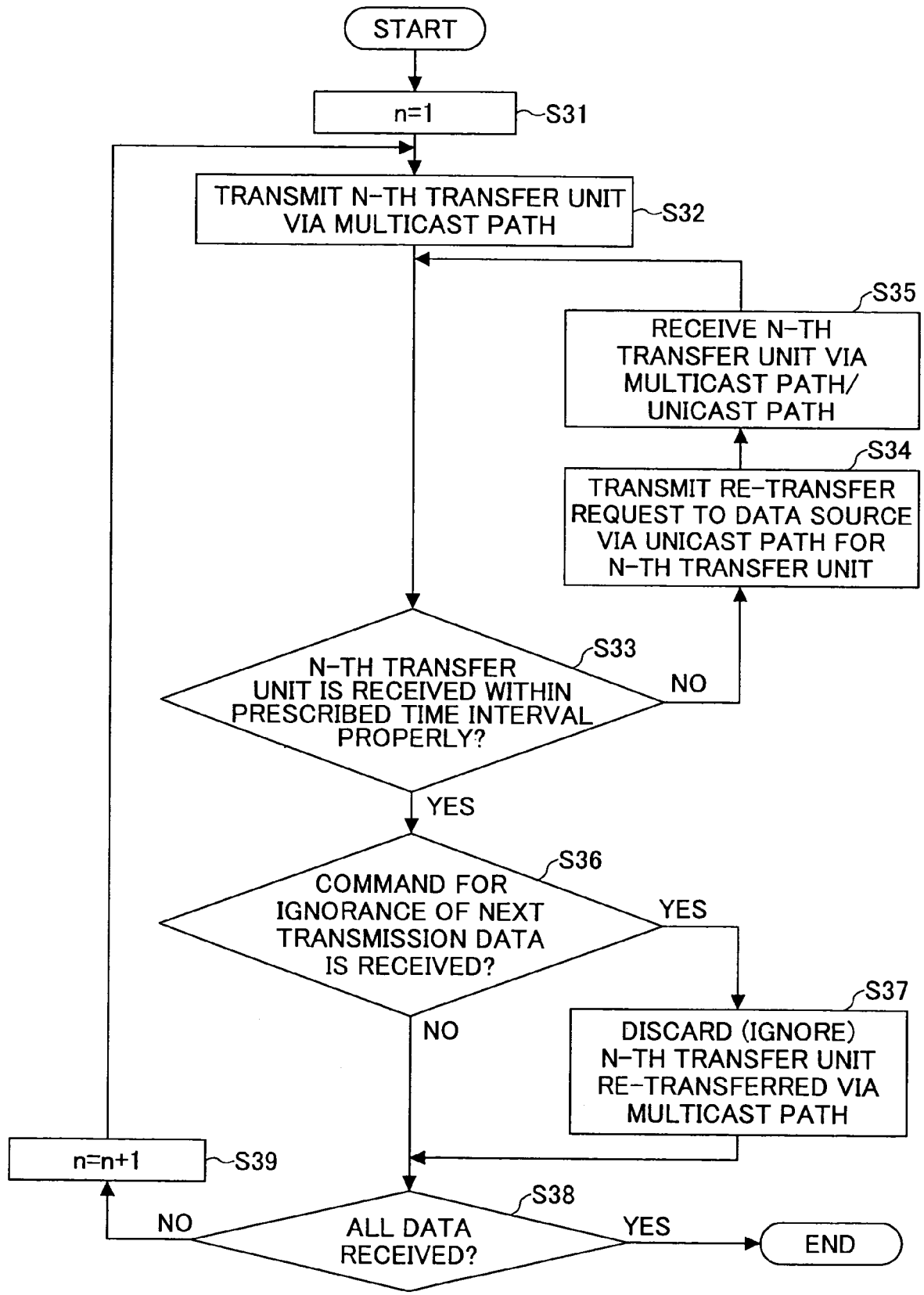
FIG. 12 is an operation flow chart which shows operation of each data destination apparatus in the embodiment of the present invention.

With reference to FIG. 12, operation of the above-mentioned data sink apparatuses 31 through 34 in a case of receiving the transmission data which is sent in the state of being divided into n transfer units sent in the process described above with reference to FIG. 11 will now be described.

The parameter n which indicates the number of transfer unit of the transmission data is initialized into 1 at Step S31. At Step S32, the n-th transfer unit is received via the multicast transmission path Pm. And at Step S33, it is determined whether proper reception of the n-th transfer unit concerned is performed within a predetermined time interval. When the determination result is No, the unicast communication path Pu is used and a re-transmission request for the n-th transfer unit concerned is transferred to the data source apparatus (Step S34). And at Step S35, via either the multicast transmission path Pm or the unicast transmission path Pu, the n-th transfer unit concerned re-transferred is received.

When the determination result of Step S33 is Yes, it is determined whether the command for ignorance of the following transferred data is received, at Step S36. When the determination result is Yes, the n-th re-received transfer unit, sent via the multicast transmission path Pm, is read but discarded or ignored thereafter, according to the above-mentioned command (Step S37).

And it is determined whether the transmission of all the data of n transfer units has been completed, at Step S38. When the determination result is Yes, the reception processing concerned is ended. When the determination result is No, the parameter n is incremented by 1 at Step S39, and the processing from Step S32 is repeated.

Thus, according to the data communication apparatus, data communication system, or the data communication method according to the embodiment of the present invention, reliable high-speed data transmission is achieved by performing resending control between the data reception side and the data transmission side.

That is, it is possible to improve the reliability of data transmission by performing data resending control as the necessarily arises even mainly applying the isochronous transmission manner in which the band width is guaranteed. Moreover, since the method in this embodiment conforms to the standard of IEEE Std 1394 completely, there is no necessity of providing any additional circuit or of a support by a special protocol, and also, the above-described scheme according to the embodiment of the present invention can coexist with the other protocols, and, thus, there is also no influence of other apparatuses connected on the same bus.

Furthermore, since the optimum communication manner is dynamically chosen to be applied for re-transfer of data, it is possible to minimize the traffic required for the error correction in one-to-many communications which perform data transmission from a single data transfer source to a plurality of data transfer destinations.

In addition, although the example of transferring the re-transmission request as the reception error information has been described in the embodiment of the present invention, it is not necessary to be limited thereto. Conversely, it is also possible that, data reception acknowledgement should be sent from each data sink apparatus to the data source apparatus using a one-to-one communication path as the asynchronous transmission manner for every reception of data transfer unit, and, when data lack or a data reception error is detected, the above-mentioned acknowledgement is not sent out.

Moreover, in the embodiment described above, although the example using the asynchronous transmission manner as the unicast communication path Pu while using the isochronous transmission manner as the multicast communication path Pm, in a use of the IEEE1394 bus as the transmission path, the substantially the same result can be obtained even when other communication manners in use of another transmission path, for example, those of a USB, may be applied instead.

Furthermore, also as to the data communication apparatus and receiving apparatuses forming the data communication system, or apparatuses performing the data communication method according to the present invention, various technical fields may be assumed to which the present invention may be applied other than those employing PC and printers described above.

Further, the present invention is not limited to the above-described embodiment, and variations and modifications may be made without departing from the basic concept of the present invention.

The present application is based on Japanese priority application No. Japanese laid-open patent application No. 2002-299630, filed on Oct. 11, 2002, the entire contents of which are hereby incorporated by reference.

What is claimed is:

1. A data communication apparatus comprising:
 a first communication part which transfers data from one single transfer source to a plurality of other transfer destinations concurrently;
 a second communication part which transfers data from one single transfer source to another single transfer destination;
 a re-transfer part which, when receiving reception error information from at least one of a plurality of other transfer destinations which indicates that data reception has not been performed properly as a result of the data transfer being performed by said first communication part for the plurality of other transfer destinations, performing data re-transfer to said at least one of other plurality of transfer destinations with one selected from said first and second communication parts according to the number of said at least one of other plurality of transfer destinations which has transmitted the reception error information, wherein upon selection of said first communication part, prior to performing said data re-transfer, an ignore instructions is communicated to that portion of said plurality of transfer destinations which did not transmit reception error information.

2. The data communication apparatus as claimed in claim 1, wherein: said first communication part employs a multicast data transmission way while said second communication part employs a unicast data transmission way.

3. The data communication apparatus as claimed in claim 2, wherein: said multicast data transmission way comprises an isochronous data transmission way while said unicast data transmission way comprises an asynchronous data transmission way.

4. The data communication apparatus as claimed in claim 1, wherein:
 a method of selecting one from the first communication part and second communication part according to the number of the at least one of the other plurality of transfer destinations which has transmitted the reception error information performed by said re-transfer part comprises a method in which one of the first and second communication parts with which the number of times of communication operations with the plurality of transfer destinations required until the re-transfer of the data which has not been performed properly is completed since the reception error information has been received becomes smaller should be selected.

5. The data communication apparatus as claimed in claim 1, wherein: the data transferred to the plurality of other transfer destinations comprises image data.

6. A data communication apparatus which receives data transferred with a first communication part which transfers data from one single transfer source to a plurality of other transfer destinations concurrently, and a second communication part which transfers data from one single transfer source to another single transfer destination, comprising:
 a re-transfer receiving part which transmits predetermined reception error information when data has not been received properly even receiving the data transferred via said first communication part, and receives the data thus not received properly and thus re-transmitted via one selected from said first and second communication parts according to the number of transfer destinations having transmitted the predetermined reception error information, and further receives an ignore instruction prior to a re-transfer of data upon selection of said first communication part for re-transfer of data when said re-transfer receiving part did not transmit reception error information.

7. The data communication apparatus as claimed in claim 6, wherein: said first communication part employs a multicast data transmission way while said second communication part employs a unicast data transmission way.

8. The data communication apparatus as claimed in claim 7, wherein: said multicast data transmission way comprises an isochronous data transmission way while said unicast data transmission way comprises an asynchronous data transmission way.

9. The data communication apparatus as claimed in claim 6, wherein: the data transferred to the plurality of other transfer destinations comprises image data.

10. A data communication system comprising:
at least one data communication apparatus, comprising a first communication part which transfers data from one single transfer source to a plurality of other transfer destinations concurrently, and a second communication part which transfers data from one single transfer source to another single transfer destination; and
a plurality of receiving apparatuses comprising a part which receives data transferred from said at least one data communication apparatus, and a part which, upon data reception with said data receiving part not having been performed properly, transmits to the data transfer source reception error information indicating this matter, wherein:
said at least one data communication apparatus comprises a re-transfer part which, when receiving the reception error information from at least one of the plurality of receiving apparatuses which indicates that data reception has not been performed properly as a result of the data transfer being performed by said first communication part for the plurality of receiving apparatuses, performs data re-transfer to said at least one of receiving apparatuses with one selected from said first and second communication parts according to the number of said at least one of other plurality of receiving apparatuses which has transmitted the reception error information, wherein upon selection of said first communication part, prior to performing data re-transfer, an ignore instructions is communicated to that portion of said plurality of transfer destinations which did not transmit reception error information.

11. The data communication system as claimed in claim 10, wherein: said first communication part employs a multicast data transmission way while said second communication part employs a unicast data transmission way.

12. The data communication system as claimed in claim 11, wherein: said multicast data transmission way comprises an isochronous data transmission way while said unicast data transmission way comprises an asynchronous data transmission way.

13. The data communication system as claimed in claim 10, wherein:
a method of selecting one from the first communication part and second communication part according to the number of the at least one of receiving apparatuses which has transmitted the reception error information performed by said re-transfer part comprises a method in which one of the first and second communication parts with which the number of times of communication operations with the plurality of receiving apparatuses required until the re-transfer of the data which has not been performed properly is completed since the reception error information has been received becomes smaller should be selected.

14. The data communication apparatus as claimed in claim 10, wherein: the data transferred to the plurality of receiving apparatuses comprises image data.

15. A data communication method for performing data communication among a plurality of apparatuses in use of a first communication manner of transferring data from one single transfer source to a plurality of other transfer destinations concurrently and a second communication manner of transferring data from one single transfer source to another single transfer destination, said method comprising the step of:
when receiving reception error information from at least one of a plurality of other transfer destinations which indicates that data reception has not been performed properly as a result of the data transfer being performed in said first communication manner for the plurality of other transfer destinations performing data re-transfer to said at least one of other plurality of transfer destinations in one selected from said first and second communication manners according to the number of said at least one of other plurality of transfer destinations which has transmitted the reception error information, wherein upon selection of said first communication part, prior to performing data re-transfer, transmitting an ignore instruction to that portion of said plurality of transfer destinations which did not transmit reception error information.

16. The data communication method as claimed in claim 15, wherein: said first communication manner comprises a multicast data transmission way while said second communication part comprises a unicast data transmission way.

17. The data communication method as claimed in claim 16, wherein: said multicast data transmission way comprises an isochronous data transmission way while said unicast data transmission way comprises an asynchronous data transmission way.

18. The data communication method as claimed in claim 15, wherein:
a method of selecting one from the first communication manner and second communication manner according to the number of the at least one of the other plurality of transfer destinations which has transmitted the reception error information performed in said re-transfer step comprises a method in which one of the first and second communication manners with which the number of times, of communication operations with the plurality of transfer destinations required until the re-transfer of the data which has not been performed properly is completed since the reception error information has been received becomes smaller should be selected.

19. The data communication method as claimed in claim 15, wherein: the data transferred to the plurality of other transfer destinations comprises image data.

20. A data communication program stored on a computer readable medium comprising instructions for causing a computer which controls a communication apparatus performing data communications, to execute with said communication apparatus data communications with a plurality of apparatuses in use of a first communication manner of transferring data from one single transfer source to a plurality of other transfer destinations concurrently and a second communication manner of transferring data from one single transfer source to another single transfer destination, said program comprising the instruction causing the computer to execute with the communication apparatus the step of:

when receiving reception error information from at least one of a plurality of other transfer destinations which indicates that data reception has not been performed properly as a result of the data transfer being performed in said first communication manner for the plurality of other transfer destinations, performing data re-transfer to said at least one of other plurality of transfer destinations in one selected from said first and second communication manners according to the number of said at least one of other plurality of transfer destinations which has transmitted the reception error information, wherein upon selection of said first communication part, prior to performing data re-transfer, transmitting an ignore instruction to that portion of said plurality of transfer destinations which did not transmit reception error information.

21. The data communication program as claimed in claim 20, wherein: said first communication manner comprises a multicast data transmission way while said second communication part comprises a unicast data transmission way.

22. The data communication program as claimed in claim 21, wherein: said multicast data transmission way comprises an isochronous data transmission way while said unicast data transmission way comprises an asynchronous data transmission way.

23. The data communication program as claimed in claim 20, wherein:

a method of selecting one from the first communication manner and second communication manner according to the number of the at least one of the other plurality of transfer destinations which has transmitted the reception error information performed in said re-transfer step comprises a method in which one of the first and second communication manners with which the number of times of communication operations with the plurality of transfer destinations required until the re-transfer of the data which has not been performed properly is completed since the reception error information has been received becomes smaller should be selected.

24. The data communication program as claimed in claim 20, wherein: the data transferred to the plurality of other transfer destinations comprises image data.

25. A data communication apparatus comprising:

a first communication part which transfers data from one single transfer source to a plurality of other transfer destinations concurrently;

a second communication part which transfers data from one single transfer source to another single transfer destination;

a re-transfer part which, when receiving reception error information from at least one of a plurality of other transfer destinations which indicates that data reception has not been performed properly as a result of the data transfer being performed by said first communication part for the plurality of other transfer destinations, performing data re-transfer to said at least one of other plurality of transfer destinations with one selected from said first and second communication parts according to the number of said at least one of other plurality of transfer destinations which has transmitted the reception error information, and wherein a method of selecting one from the first communication part and second communication part according to the number of the at least one of the plurality of transfer destinations which has transmitted the reception error information performed by said re-transfer part comprises a method in which one of the first and second communication parts with which the number of times of communication operations with the plurality of transfer destinations required until the re-transfer of the data which has not been performed properly is completed since the reception error information has been received becomes smaller should be selected.

* * * * *